United States Patent
Beecherl et al.

(10) Patent No.: US 6,637,737 B1
(45) Date of Patent: Oct. 28, 2003

(54) WORKPIECE MICRO-POSITIONING APPARATUS

(75) Inventors: Peter M. Beecherl, Shelby Township, MI (US); Ali M. Saeedy, Steerling Heights, MI (US); Hugh J. Doherty, Rochester Hills, MI (US); Philip S. Szuba, Algonac, MI (US); Donald D. Pagels, Sr., Warren, MI (US)

(73) Assignee: Unova IP Corp., Woodland Hills, CA (US)

( * ) Notice: Subject to any disclaimer, the term of this patent is extended or adjusted under 35 U.S.C. 154(b) by 0 days.

(21) Appl. No.: 10/210,710

(22) Filed: Jul. 31, 2002

(51) Int. Cl.[7] .................................................. B23Q 1/25
(52) U.S. Cl. ........................ 269/71; 269/289 R; 269/60
(58) Field of Search ........................ 269/71, 73, 289 R, 269/60

(56) References Cited

U.S. PATENT DOCUMENTS

| | | | | |
|---|---|---|---|---|
| 2,538,640 A | * | 1/1951 | Click ........................... | 269/71 |
| 3,690,642 A | | 9/1972 | Angelstrand et al. | |
| 4,262,891 A | | 4/1981 | Kinney | |
| 4,586,702 A | | 5/1986 | Chambers | |
| 4,726,577 A | * | 2/1988 | Pontis .......................... | 269/71 |
| 4,896,869 A | * | 1/1990 | Takekoshi .................... | 269/60 |
| 5,239,160 A | | 8/1993 | Sakura et al. | |
| 5,301,933 A | * | 4/1994 | Inoue .......................... | 269/73 |
| 5,468,101 A | * | 11/1995 | Shoda ......................... | 409/202 |
| 5,760,564 A | | 6/1998 | Novak | |
| 5,812,310 A | | 9/1998 | Stewart et al. | |
| 6,305,678 B1 | * | 10/2001 | Hammersmith et al. ...... | 269/71 |

* cited by examiner

*Primary Examiner*—Lee D. Wilson
(74) *Attorney, Agent, or Firm*—Reising, Ethington, Barnes, Kisselle, P.C.

(57) ABSTRACT

A workpiece micro-positioning apparatus for correcting small pitch and yaw location errors in a workpiece supported on a fixture for a manufacturing operation such as precision machining or assembly comprises a biaxial micro-positioner that includes pitch and yaw motion mechanisms that support a workpiece for rotation about respective pitch and yaw axes. The yaw motion mechanism supports the pitch motion mechanism for rotation about a yaw axis generally normal to the pitch axis. A base supports the yaw motion mechanism. A fixture fixed to the micro-positioner releasably holds a workpiece. The micro-positioner allows the fixture to rotate about the pitch and yaw axes to correct any pitch and yaw deviations from a desired workpiece attitude relative to the base and to releasably lock the pitch and yaw motion mechanisms following such correction. A manufacturing tool releasably supports the micro-positioner and rotates the micro-positioner, fixture and a workpiece mounted in the fixture, about a roll axis generally normal to the pitch and yaw axes as required to correct any roll error in workpiece attitude. The manufacturing tool then performs a manufacturing operation on the workpiece.

15 Claims, 9 Drawing Sheets

WORKPIECE MICRO-POSITIONING APPARATUS

BACKGROUND OF THE INVENTION

1. Field of the Invention

This invention relates generally to a workpiece micro-positioning apparatus for correcting small pitch and yaw location errors in a workpiece supported on a machine tool fixture for manufacturing operations such as precision machining and assembly.

2. Description of the Related Art Including Information Disclosed Under 37 CFR 1.97 and 1.98

Fixturing is a critical and expensive process that must be undertaken in preparation for machining a workpiece such as a cylinder head for an internal combustion engine. In all high volume machining systems, dedicated fixtures are used to locate and hold workpieces. The dedicated nature of fixturing is arguably the greatest barrier to implementing truly flexible machining systems for workpieces.

For example, automobile manufacturers are currently faced with consumer demand for a large variety of powertrain options. This demand compels a change in manufacturing from a dedicated transfer system capable of producing 250,000 workpieces of a single configuration annually to a flexible transfer system that can produce 50,000–100,000 each of workpieces of different configurations. However, despite the availability of highly flexible CNC-type machines, the fixturing of workpieces of varying configurations during machining at high production rates requires time-consuming changeovers and incurs a large capital cost. In many fixturing systems, locating surfaces on the fixture and corresponding locating surfaces on each workpiece must be machined to close tolerances to insure that each workpiece is accurately positioned in the fixture for machining. The requirement for fixed, dedicated, mechanical locators for each workpiece configuration is the critical technology that limits the flexibility of machining fixtures.

Figure 1:
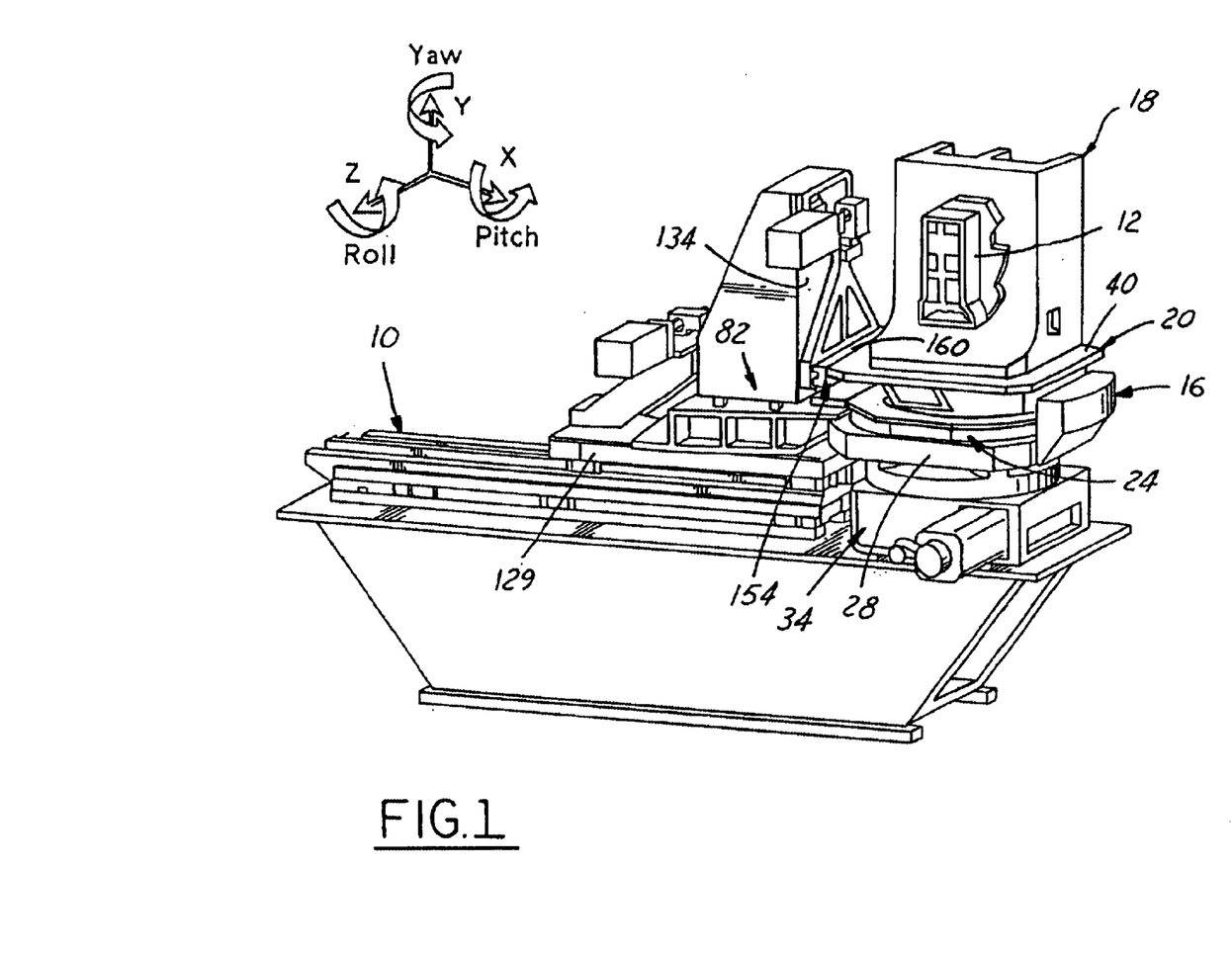
FIG. 1 is an isometric front view of a workpiece micropositioning apparatus constructed according to the invention and supporting a workpiece.

A part location system must account for three attitude and three location errors that can result from loading and clamping a workpiece in its fixture. As shown in FIG. 1, the directions of the three location errors are along horizontal X and Z axes and a vertical Y axis. The directions of the three attitude errors are pitch about the X axis, roll about the Z axis, and yaw about the Y axis. Machine tools generally provide linear motion along the X, Y and Z axes with the Z axis oriented in the direction of spindle feedout. Four of the errors resulting from loading and clamping, i.e., in the X, Y, and Z directions and roll about the Z axis, can be corrected by simple work coordinate offsets in the machine tool controller. The remaining two errors, pitch about the X axis and yaw about the Y axis, generally within ±2.5 degrees, cannot be corrected by such a machine tool.

U.S. Pat. No. 4,262,891 issued Apr. 21, 1981 to Kinney, discloses a workpiece positioning apparatus that includes a tri-axial workpiece holder. The holder includes three rotatable and releasably lockable platforms configured to support a workpiece for rotation about a pitch, roll and yaw axes. The holder also includes three drives operably coupled to the respective platforms to rotate the platforms about their respective axes to change the alignment of a supported workpiece relative to a single tool. The Kinney positioner cannot position workpieces for machining by other tools. Neither can the Kinney positioner operate without internal actuation systems or power, or rotate more than one platform by manipulating only one of the platforms. Also, the stability provided by the Kinney workpiece holder for precision machining operations is limited because Kinney's first and second platforms are supported on respective drive shafts, each shaft being less than a fifth the diameter of their respective platforms.

U.S. Pat. No. 5,239,160 issued Aug. 24, 1993 to Sakura et al., discloses a workpiece positioning apparatus for a laser cutter. The apparatus includes a three-axis table mechanism including an x-axis table supported for linear motion in the x direction. The x-axis table is supported in overlapping relationship on a y-axis table that is supported for linear motion in the y direction on a z-axis table. The z-axis table is supported on a support surface for linear motion in the vertical z direction. A biaxial workpiece holder is supported on the three-axis table mechanism and tilts and rotates a workpiece about the x and z axes, respectively. The holder comprises a rotatable work holder platform that supports a workpiece for rotation about a first (vertical z) axis, and a second platform configured to support the first platform for rotation about a second (x) axis normal to the first axis. The workpiece positioning apparatus of the Sakura et al. patent includes linear x, y and z axis drives operably connected to the respective x, y and z-axis tables. The drives move the tables in the respective x, y and z directions. A first servomotor is drivingly connected to the rotatable work holder platform and rotates the work holder platform about z-axis. A second servo motor is drivingly connected to the second platform and rotates the second platform about the x axis. However, the Sakura et al. workpiece holder is fixed to the table mechanism and cannot positively locate a workpiece on locating platforms of different machine tools or laser cutters. Neither can the Sakura et al. system operate without internal actuation systems or power or to rotate more than one platform by manipulating only one of the platforms. Also, the stability provided by the Sakura workpiece holder, while sufficient for laser cutting, would be inadequate for precision mechanical machining operations. One reason for this is that Sakura's first (work holder) platform is supported on a drive shaft less than a third the diameter of the platform and its second platform is cantilevered on another drive shaft.

BRIEF SUMMARY OF THE INVENTION

The invention is a workpiece micro-positioning apparatus for correcting small pitch and yaw location errors in a workpiece supported on a machine tool fixture for manufacturing operations such as precision machining and assembly. The apparatus comprises a biaxial micro-positioner including a pitch motion mechanism configured to support a workpiece for rotation about a pitch axis and a yaw motion mechanism supporting the pitch motion mechanism for rotation about a yaw axis generally normal to the pitch axis. A base supports the pitch and yaw motion mechanisms. The workpiece micro-positioning apparatus also includes a fixture fixed to the micro-positioner and configured to releasably hold a workpiece. The micro-positioner is configured to allow rotation of the fixture about the pitch and yaw axes to correct any pitch and yaw deviations from a desired workpiece attitude relative to the base and to releasably lock the pitch and yaw motion mechanisms following such correction. The workpiece micro-positioning apparatus is used in conjunction with a first machine tool releasably supporting the micro-positioner and configured to rotate the micro-positioner, fixture and a workpiece mounted in the fixture, about a roll axis generally normal to the pitch and yaw axes as required to correct any roll error in workpiece attitude. The first machine tool is configured to then perform a first machining operation on the workpiece. The base precisely and releasably locates the micropositioner on the first machine tool.

According to another aspect of the invention, the apparatus includes a manipulator configured to releasably engage the micro-positioner and rotate the pitch and yaw motion mechanisms about the pitch and yaw axes, respectively.

According to another aspect of the invention, the base is configured to positively locate the micro-positioner, fixture, and workpiece on one or more machine tools. Each machine tool is configured to move the micro-positioner into a position positively locating a workpiece mounted on the fixture for machining.

According to yet another aspect of the invention, the yaw motion mechanism includes a rotatable and releasably lockable rotary plate supported on the base for rotation about the yaw axis. The pitch motion mechanism includes a releasably lockable tilt plate disposed parallel to the pitch axis and supported on the rotary plate for tilting motion about the pitch axis.

According to another aspect of the invention, inner and outer radially spaced concentric supports rotatably support the rotary plate of the micro-positioner to limit motion of a supported workpiece under machining loads.

The invention also includes a method for correcting small pitch and yaw location errors in a workpiece supported on a machine tool fixture for manufacturing operations such as precision machining and assembly. According to this method one can correct small pitch and yaw location errors in a workpiece supported on a machine tool fixture by first securing a workpiece on the fixture, then causing the manipulator to engage the micro-positioner. The manipulator then corrects pitch and yaw attitude errors of the workpiece relative to the micro-positioner base by actuating the manipulator to rotate the workpiece about the pitch and yaw axes. The manipulator then disengages the micro-positioner. A machine tool is provided to perform a machining operation on a workpiece supported on a fixture supported on a locating platform on the first machine tool. The micropositioner is precisely located in a predetermined position on the first machine tool.

Objects, features and advantages of this invention include providing a workpiece micro-positioning apparatus that corrects the two misalignments of the workpiece that cannot be corrected by a standard 3-axis machine tool, that allows the fixture and workpiece to be moved as a unit from one machine tool or three-axis machine tool to another without repeating the micro-positioning procedure, that can take a rough workpiece and precisely orient it just once for a series of manufacturing operations, that can operate without internal actuation systems or power, that is sufficiently stable to support precision mechanical machining operations, that drastically reduces the lead-time necessary for workpiece changeover and the overall cost of manufacturing, and that eliminates the need to fabricate mechanical locators for each workpiece to be machined.

BRIEF DESCRIPTION OF THE DRAWINGS

These and other objects, features and advantages of this invention will be apparent from the following detailed description of the preferred embodiment(s) and best mode, appended claims, and accompanying drawings in which:

DETAILED DESCRIPTION OF INVENTION EMBODIMENT(S)

Shown in the figures is a workpiece micro-positioning apparatus 10 for correcting small pitch and yaw location errors in a workpiece 12 supported on a manufacturing tool such as a machine tool for a manufacturing operation such as precision machining or assembly. The apparatus 10 comprises a biaxial micro-positioner 16, and a fixture 18 fixed to the micropositioner 16. The micro-positioner 16 includes a pitch motion mechanism best shown at 20 in FIGS. 5 and 6. The pitch motion mechanism 20 supports a workpiece 12 for rotation about a pitch axis 22 and a yaw motion mechanism, shown at 24 in FIG. 4, that supports the pitch motion mechanism 20 for rotation about a yaw axis 26 generally normal to the pitch axis 22. A base 28 supports the pitch and yaw motion mechanisms 20, 24. The fixture 18 releasably holds a workpiece 12 and the micro-positioner 16 allows rotation of the fixture 18 about the pitch and yaw axes 22, 26 to correct any pitch and yaw deviations from a desired workpiece attitude relative to the base 28. The micropositioner 16 also releasably locks the pitch and yaw motion mechanisms 20, 24 following such correction. The micropositioner base 28 positively and removably locates the micro-positioner 16 on a locating platform of a manufacturing tool such as a machine tool that supports and makes linear x, y and z coordinate corrections in the position of the micro-positioner 16, fixture 18, and a workpiece 12 mounted in the fixture 18 as required to correct any roll error in workpiece attitude.

The micro-positioner 16 is designed to be supported on any one of a number of different manufacturing tools known in the art such as a standard machine tool constructed to precisely locate a fixture-mounted workpiece 12 for machining by moving the fixture along orthogonal x, y and z axes. Machine tools of this type are also capable of correcting workpiece roll error through x, y and z axes linear motion before performing machining operations on the workpiece 12.

Figure 2:
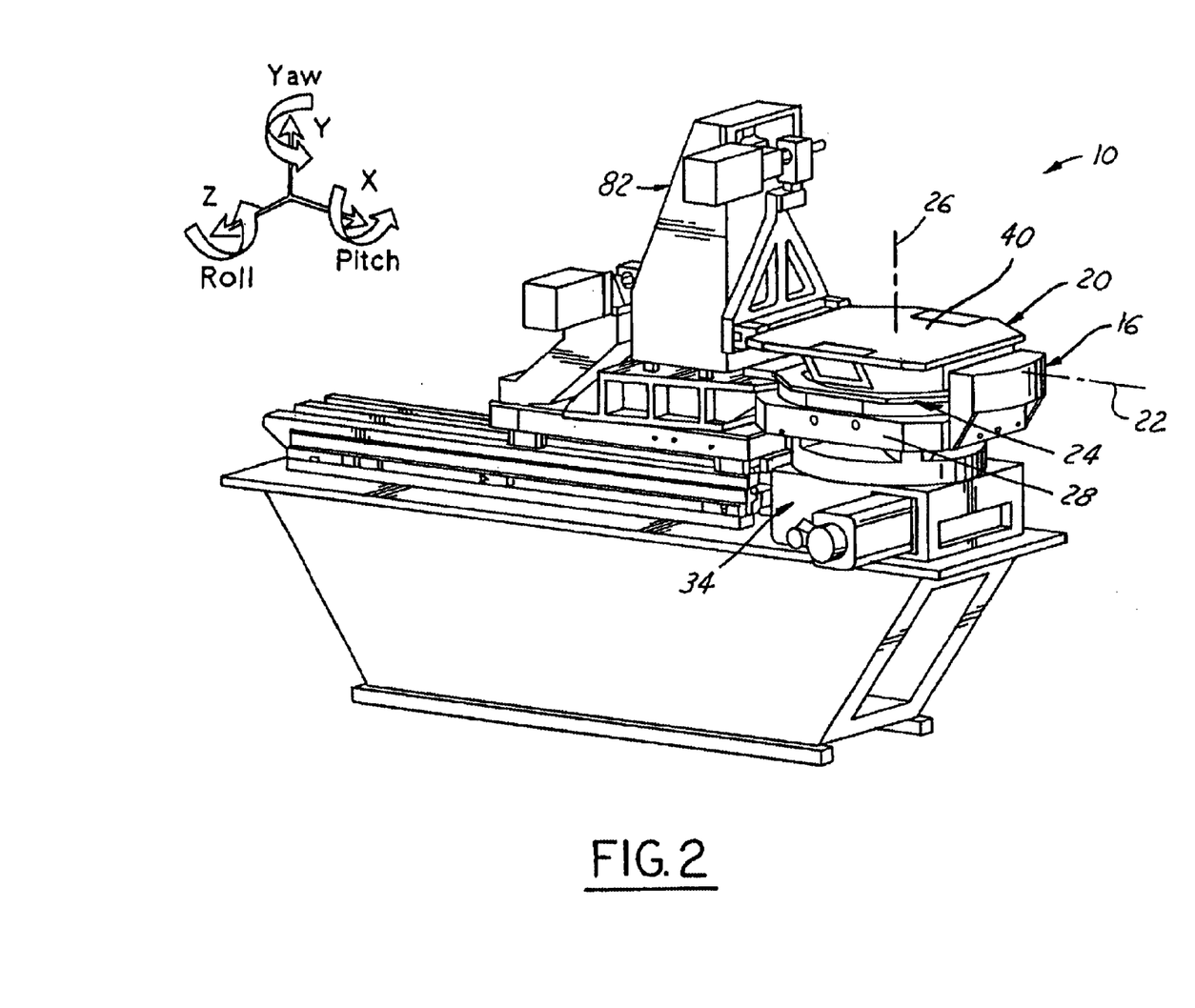
FIG. 2 is an isometric front view of the apparatus of FIG. 1 with the workpiece and a workpiece-holding fixture of the apparatus removed.
Figure 3:
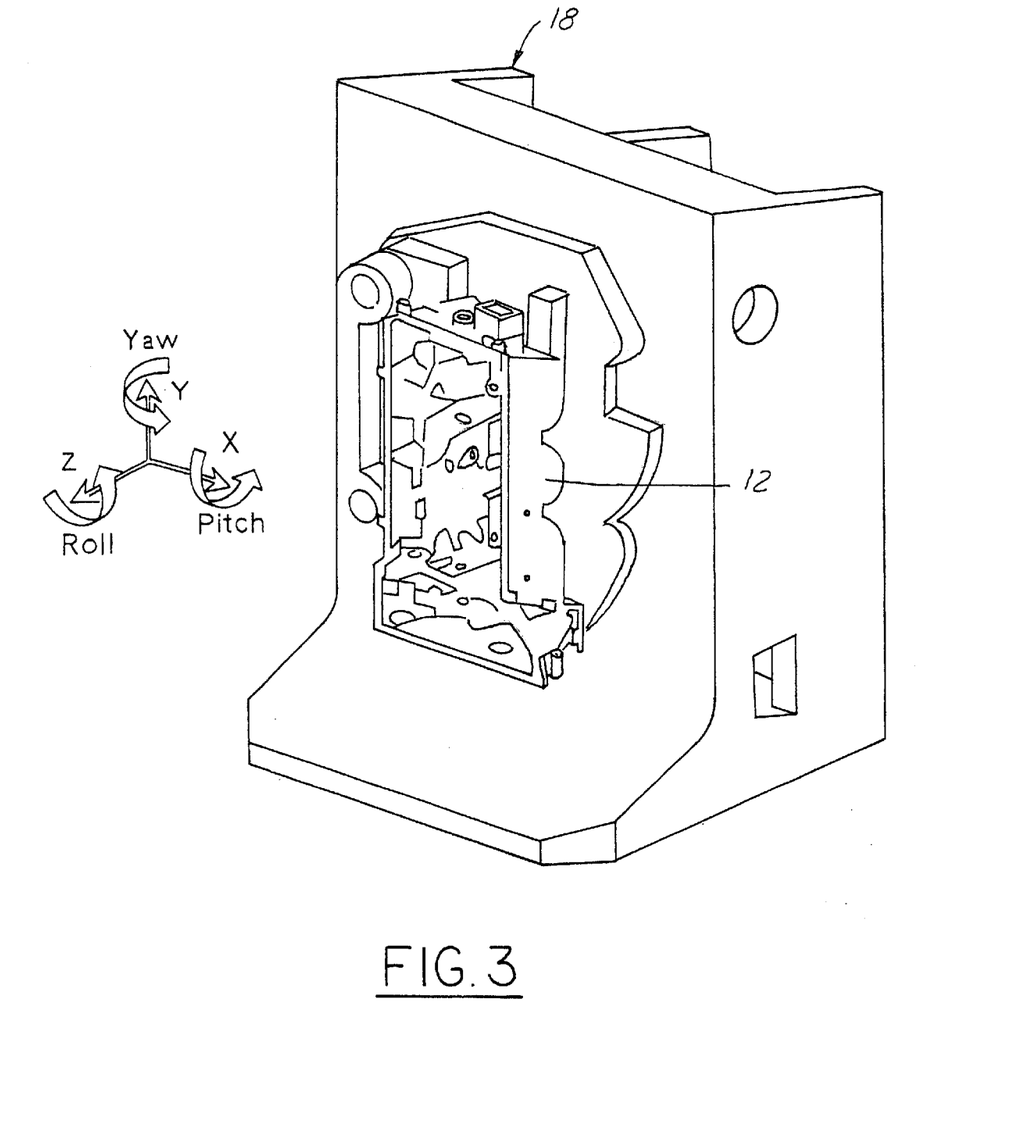
FIG. 3 is an isometric view of the workpiece-holding fixture of the apparatus of FIG. 1 holding a workpiece.

As shown in FIGS. 1 and 2, the base 28 of the micropositioner 16 may be mounted on a micro-positioning station 34. The base 28 of each micro-positioner 16 includes detents in the form of tapered frusto-conical locating apertures (not shown) that are positioned to engage or receive corresponding detents in the form of tapered posts or cones (not shown) extending from standard machine tool locating platforms. As such, the micro-positioner 16, fixture 18, and workpiece 12 can be positively located on existing standard machine tool locating platforms without modification. The micropositioner base 28 is formed from a standard machine pallet. To form the base 28, a standard pallet is modified to accommodate a yaw motion locking device 35 and to support the yaw motion mechanism 24 as is described in detail below. As such, the micropositioner base 28 can be used to positively and serially locate the micro-positioner 16, fixture 18, and a workpiece 12 for subsequent mounting on any number of machine tool locating platforms. The machine tools supporting those platforms move the micro-positioner 16, in turn, into respective positions that positively locate a workpiece 12 mounted on the fixture 18 for different machining operations.

The yaw motion mechanism 24 includes a rotatable and releasably lockable rotary plate 38 supported on the base 28 for rotation about the yaw axis 26. The pitch motion mechanism 20 includes a releasably lockable tilt plate 40 disposed parallel to the pitch axis 22 and supported on the rotary plate 38 for tilting motion about the pitch axis 22. The pitch and yaw motion locking devices 35, 76 releasably lock the respective rotary and tilt plates 38, 40 adjacent outer edges of the plates to increase stability for precision machining.

The yaw motion mechanism 24 is constructed to have a high axial and bending stiffness to withstand high cutting forces applied to a workpiece 12 mounted on a fixture 18 supported on the micro-positioner 16. Because these cutting forces are applied to a workpiece 12 mounted in a fixture 18 supported on the micro-positioner 16, they generate a moment about the rotary plate 38 as well as a downward axial force into the rotary plate 38. To resist this moment and axial force, inner and outer radially-spaced concentric supports 42, 44 rotatably support the rotary plate 38. The concentric supports 42, 44 provide platform stability necessary to allow precision mechanical machining.

The outer concentric support comprises an annular bearing 44 positioned coaxially about the yaw axis 26 to provide the broadest possible base of support for the rotary plate 38 to preclude movement under machining loads. The annular bearing 44 includes upper and lower preloaded needle roller annular thrust bearings 48, 46 that also serve to rotatably retain the rotary plate 38. The lower bearing 46 seats between the base 28 and rotary plate 38, while the upper bearing 48 seats between the rotary plate 38 and a retaining ring 50. This bearing assembly 44 is preloaded by adjusting the thickness of a spacer 52 sandwiched between the retaining ring 50 and base 28.

The inner concentric support comprises a preloaded, double row cylindrical bearing 42 that mounts in a central bore 54 formed in the base 28 and attaches to a pivot shaft 56. The cylindrical bearing 42 helps to control the accuracy of yaw corrections and to maintain the radial stiffness of the yaw motion. The cylindrical bearing 42 is sealed by three o-rings against contaminants associated with machining operations. The three o-rings are disposed between the pivot shaft 56, a retaining plate 60, and the bearing bore 54. In addition, the entire rotary plate 38 is sealed via an o-ring disposed between the retaining ring 50 and a seal plate 173.

Figure 5:
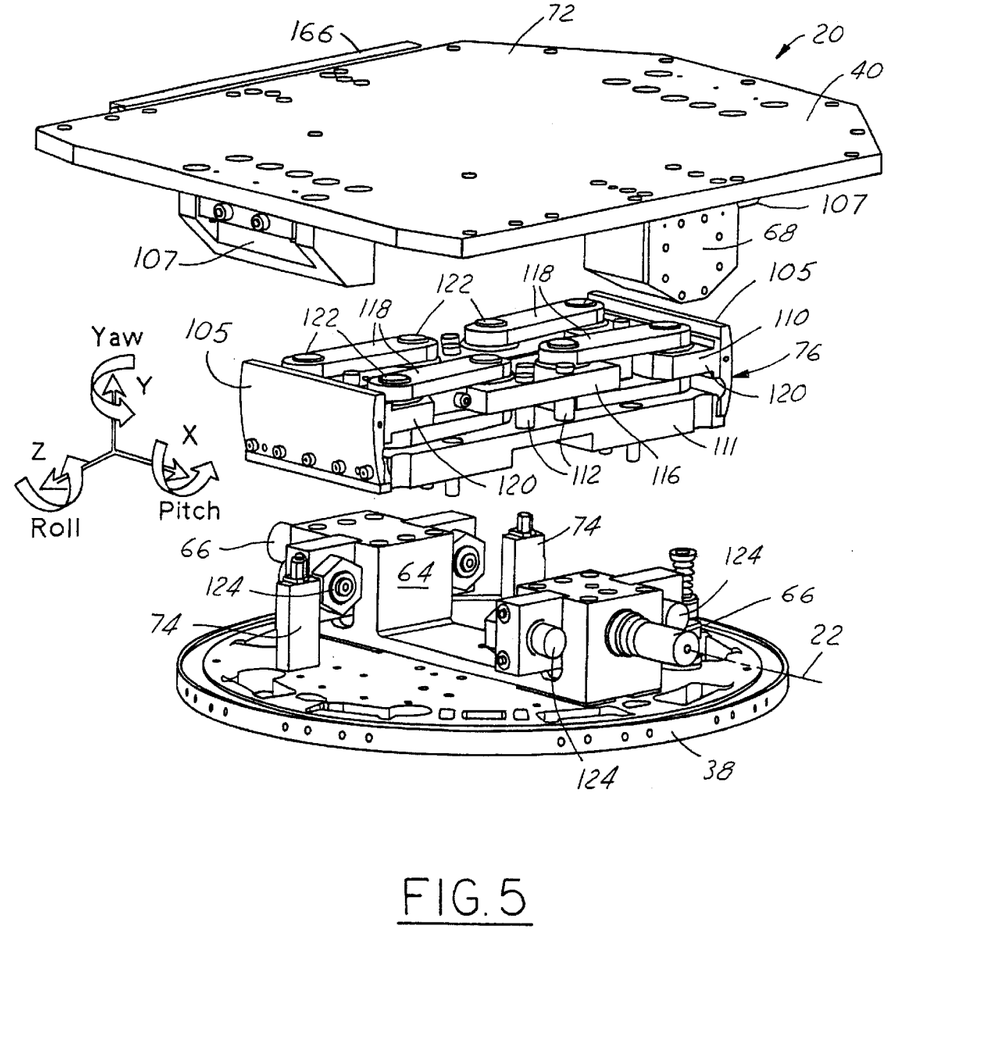
FIG. 5 is a partially exploded isometric view of a pitch motion mechanism and pitch motion locking device of the apparatus of FIG. 1 with a force multiplying mechanism of the locking device shown unexploded.

The pitch motion mechanism 20 of the micro-positioner 16 mounts to the rotary plate 38 of the yaw motion mechanism 24 as best shown in FIG. 5. The mechanism 20 includes a generally "U" shaped tilt block 64 and integral pivot shafts 66 that allow the pitch motion locking mechanism 76 to be mounted over a middle portion of the block 64. The tilt block 64 has a one-piece design so that a centerline of its integral pivot shafts 66 can be easily machined inline—a feature that further improves the accuracy of the mechanism.

Attached to the pivot shafts 66 are two bearing blocks 68. Each bearing block houses a precision double row cylindrical roller bearing. These bearings provide guidance for the pitch motion as well as requisite stiffness in the Y and Z-directions. One of the blocks 68 also houses an angular contact thrust bearing that provides the X-direction stiffness of the mechanism. The bearing blocks 68 mount to the tilt plate 40 of the micro-positioner 16. A top surface 72 of the tilt plate 40 is the surface that the fixture 18 mounts to. To insure that the tilt plate 40 can articulate a total of ±2.5° in pitch, two precision stops 74 are mounted to the rotary plate 38.

To seal the pitch motion mechanism 20 against contaminants encountered in machining operations, a standard bellows type cover (not shown) is attached between the underside of the tilt plate 40 and the seal plate 173. This bellows, along with the yaw motion seal, insures that no contaminates are allowed to enter the micro-positioner 16.

The micro-positioner 16 includes the yaw motion locking device 35 and an on-board mechanical pitch motion locking device 76. The locking devices 35, 76 releasably anchor the pitch and yaw motion mechanisms 20, 24 against pitch and yaw motion, respectively. This prevents the attitude of a workpiece 12 mounted in the fixture 18 from varying relative to the base 28 during transport or machining.

The pitch and yaw motion locking devices 35, 76 are biased into respective locked positions and are released by hydraulic pitch and yaw motion lock release assemblies 78, 80. As is described more fully below, the release assemblies 78, 80 drive the locking devices 35, 76 into respective released positions when a two-axis servo manipulator, such as the one shown at 82 in FIGS. 1, 2, 7, 9, and 10, engages the micro-positioner 16 on the micro-positioning station 34. As is also more fully described below, this allows the manipulator 82 to engage and microposition a workpiece 12 relative to the micropositioner base 28.

Figure 4:
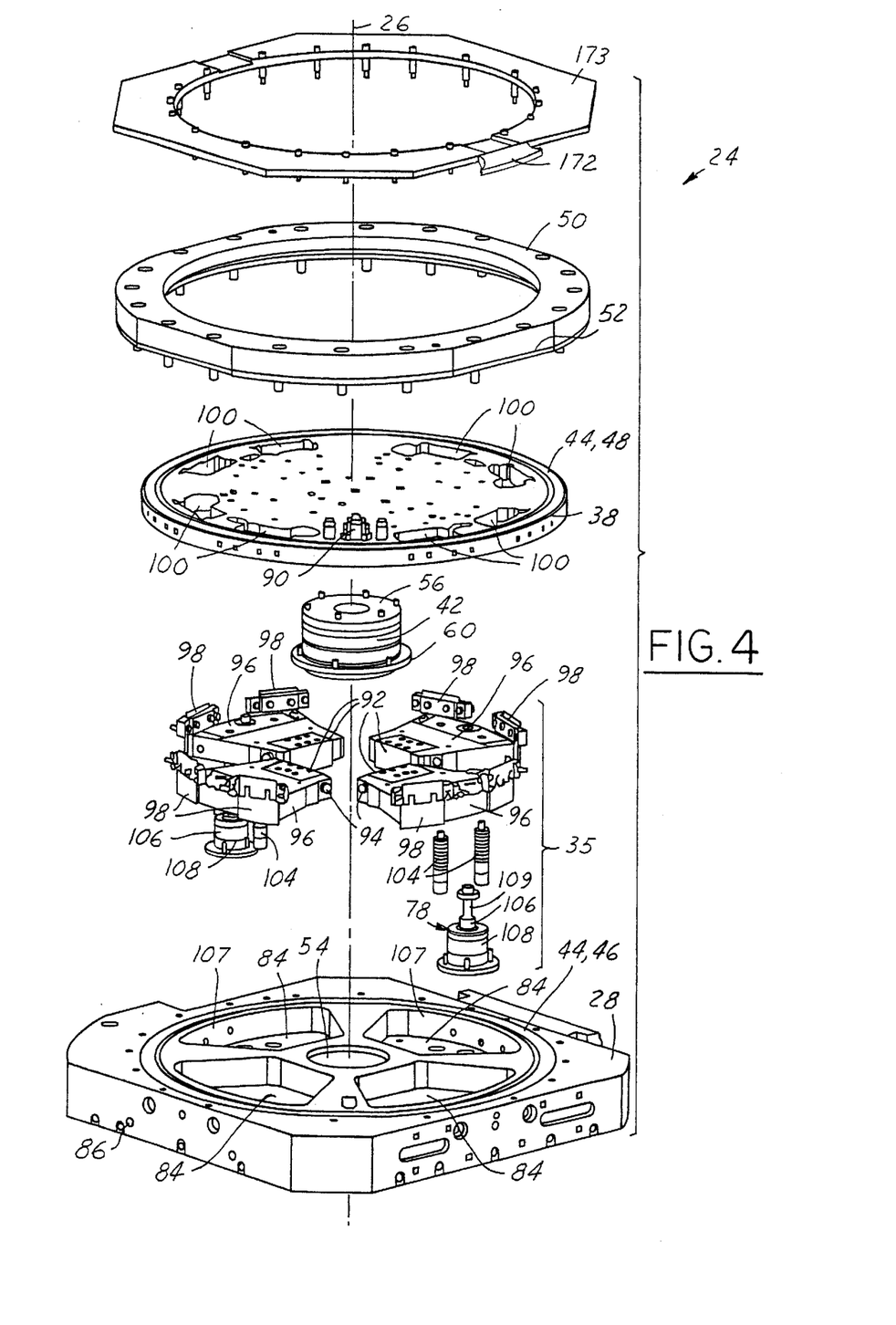
FIG. 4 is an exploded isometric view of a yaw motion mechanism and yaw motion locking device of the apparatus of FIG. 1.

To accommodate the yaw motion locking device 35, the base 28 includes the bearing bore 54, underside bores and four pockets 84 shaped to receive and hold yaw motion locking device components as best shown in FIG. 4. The base 28 also includes internal ports 86 for channeling hydraulic fluid to the yaw motion lock release assembly 78. The yaw motion locking device 35 mounts into the base 28 via the underside bores and pockets 84. The rotary plate 38 precisely attaches to the pivot shaft 56 via a precision bore in the underside of the rotary plate 38. A precision stop 90 is mounted to the base 28 and is positioned to engage and limit yaw motion of the rotary plate 38 to a total of ±2.5°.

The yaw motion locking device 35 uses the base 28 and the rotary plate 38 as mounting details and includes four pivot blocks 92, each of which mounts in one of the pockets 84 formed in the base 28. A horizontal shaft 94 joins each pivot block 92 to a corresponding brake arm 96. The shafts 94 allow the brake arms 96 to rotate about axes of their respective shafts 94. Eight brake pads 98 mount in eight respective pockets 100 formed at spaced locations around and near an outer circumference of the rotary plate 38. Locking force is generated by eight die springs 104 that fit on respective adjustable spring posts 106 that thread, at their respective lower ends, into the base 28. Upper ends of the spring posts 106 are received into apertures formed in the undersides of the brake arms 96. Two springs 104 thus bias each brake arm 96 upward. As each brake arm 96 pivots upward under the force of the springs 104, it contacts a pair of brake pads 98 and forces the pads 98 to elastically deflect into one of four inner circumferential brake drum surfaces 107 that partially define each of the pockets 84 formed in the base 28. Clearances between the brake arms 96 and their respective brake pads 98 are small and controlled. Clearances between the brake pads 98 and their respective drum surfaces 107 are also are small and controlled when the brake arms 96 are in respective returned positions. The pivoting brake arms 96 possess a large mechanical advantage—an advantage that multiplies the force of the springs into a large normal force at each brake pad 98. This normal force creates a large frictional force between the brake pads 98 and the corresponding drum surfaces 107. This locking force resists any yaw motion when the micro-positioner 16 is locked.

The yaw motion lock release assembly 78 includes four single-acting hydraulic cylinders 108 that provide the force required to unlock the yaw motion locking device 35. Each cylinder 108 mounts in one of the pockets 84 formed in the base 28. A cylinder rod 109 of each hydraulic cylinder connects to one of the brake arms 96. When the cylinders 108 are actuated, they pull their respective brake arms 96 downward, creating clearance between the brake arms 96 and the brake pads 98 as well as between the brake pads 98 and the drum surfaces 107. This clearance is sufficient to allow the rotary plate 38 to turn. The four single-acting hydraulic cylinders 108 are internally piped together so that they can be actuated simultaneously.

The pitch motion locking device 76 comprises the tilt plate 40 that mounts to the rotary plate 38. Two brake leaves 105 mount to the base plate 111, one on each end. To lock the device 76 and prevent any unwanted pitch motion, each of the brake leaves 105 is deflected into a corresponding brake drum surface 107 by a force multiplying mechanism 110. The high nornal force generated by the force multiplying mechanism 110 creates a large frictional force that resists any unwanted pitch motion.

Figure 6:
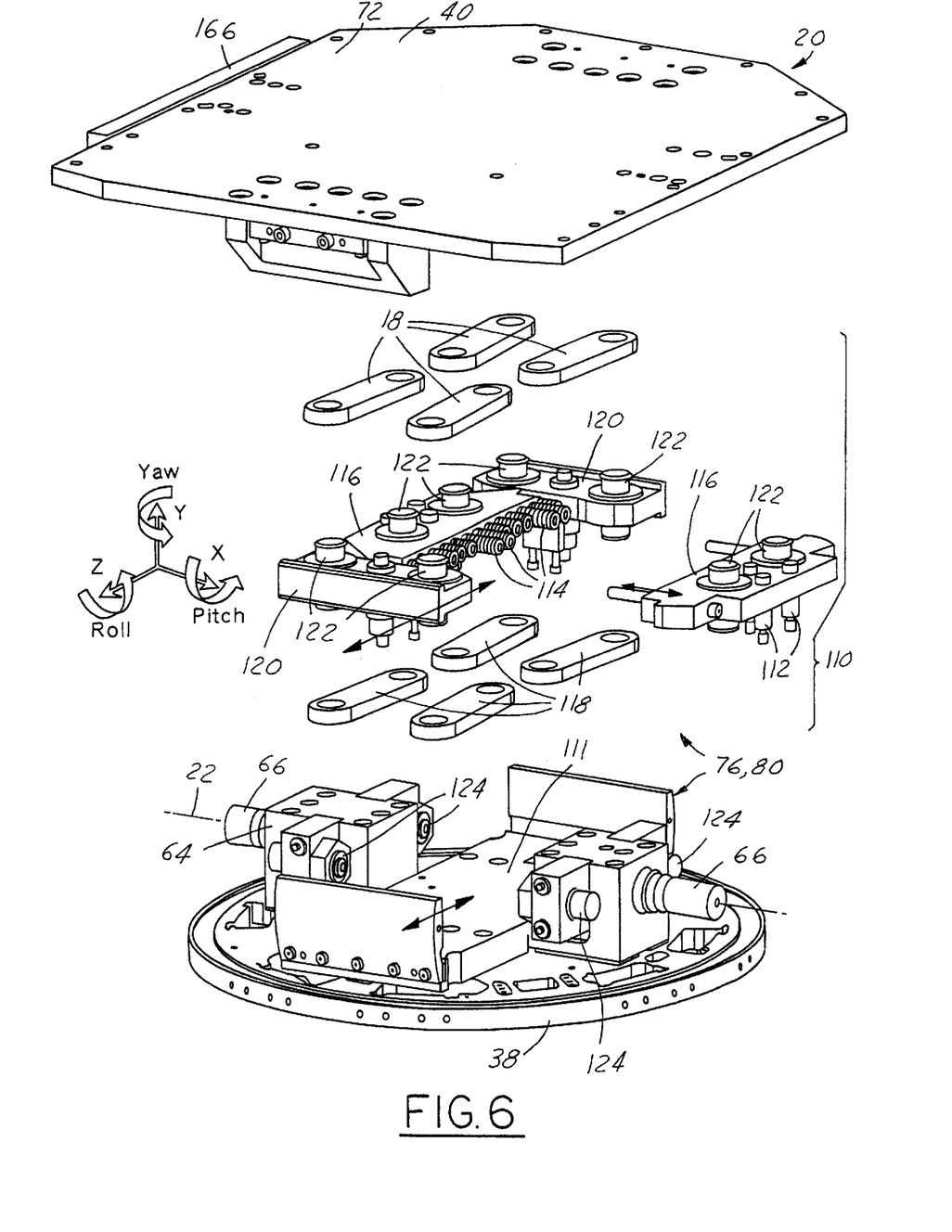
FIG. 6 is a more fully exploded isometric view of the pitch motion mechanism and pitch motion locking device of FIG. 5 with the force multiplying mechanism exploded.

As shown in FIGS. 5 and 6, the force multiplying mechanism 110 mounts to a base plate 111 via spacer blocks 112 to provide clearance between the base plate 111 and the mechanism 110. The force multiplying mechanism 110 includes a series of die springs 114 that generate force in the X-direction. This force pushes a pair of spring retainers 116 apart. Eight links 118 join the spring retainers 116 to two force blocks 120 via eight pivot pins 122. As the spring retainers 116 move apart, the links 118 move and generate a motion in the Z-direction. Due to the initial angle of the links 118 and a small actuation distance, each force block 120 will always move in the direction of its corresponding brake leaf 105. The clearance between the brake leaf 105, brake drum 107, and the force block 120 limits the travel. Minimizing the clearances maximizes the normal force and reduces the bending stress generated in the brake leaves 105.

The pitch motion lock release assembly includes four single-acting hydraulic cylinders 124 actuable to unlock the pitch motion locking device 76. The cylinders 124 thread into the retaining blocks 126 and are locked into place via lock nuts 128. The retaining blocks 126 mount to the sides of the tilt block 64. When the cylinders 124 are actuated, they push the two spring retainers 116 together. This generates a clearance between the brake leaf 105, brake drum 107, and the force block 120. This clearance allows the pitch motion mechanism 20 to move.

The servo manipulator 82 is designed to releasably engage the micro-positioner 16 and rotate the pitch and yaw motion mechanisms 20, 24 about pitch and yaw axes 22, 26, respectively. This allows any number of micro-positioners to be micropositioned by a single manipulator 82 and obviates the need to incorporate manipulator drive mechanisms into each micro-positioner 16.

As shown in FIGS. 7–10, the manipulator 82 includes a yaw drive 127 and a pitch drive 128. The yaw drive 127 is operably coupleable to the micro-positioner 16 and rotates the yaw motion mechanism 24 about the yaw axis 26. The pitch drive 128 is also operably coupleable to the micro-positioner 16 and rotates the pitch motion mechanism 20 about the pitch axis 22. The manipulator 82 actuates both the pitch and yaw motion mechanisms 20, 24 by engaging and manipulating the tilt plate 40 of the pitch motion mechanism 20 as shown in FIGS. 1, 5, and 6. A standard linear slide unit 129 supports the manipulator 82 for reciprocal motion between an engaged position engaging the tilt plate 40 of a micro-positioner 16 supported on the micro-positioning station 34 as shown in FIG. 1, and a disengaged position disengaged from the tilt plate 40 and spaced from the micro-positioning station 34.

The yaw drive 127 includes two curved linear ball rails 130 mounted on the linear slide unit 129. A rotary platen 132 mounts to the ball rails 130 while a column 134 mounts directly to the platen 132. The column 134 includes a mounting surface 136 for a pitch motion actuator 137 of the pitch drive 128 arid an integral clevis 138. A yaw motion actuator 140 of the yaw drive 127 mounts on a riser 142 so that the yaw motion actuator 140 can be aligned with the levis shown at 138 in FIG. 7. A yaw link 144 connects the yaw motion actuator 140 to the integral clevis 138. This yaw link 144 is necessary to provide compliance as the linear motion of the yaw motion actuator 140 is transformed to rotation about the curved linear ball rails 130. Both pitch and yaw motion actuators 140, 137 are standard liner drive systems including servomotors and ball screw drives.

Figure 7:
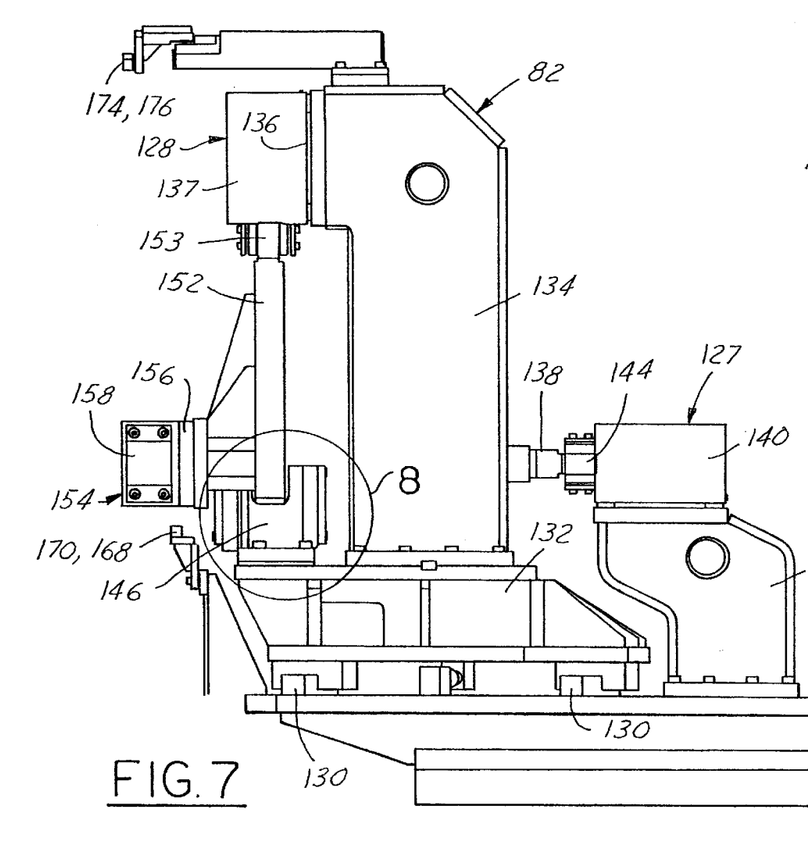
FIG. 7 is a back view of a micro-positioner manipulator of the apparatus of FIG. 1.
Figure 8:
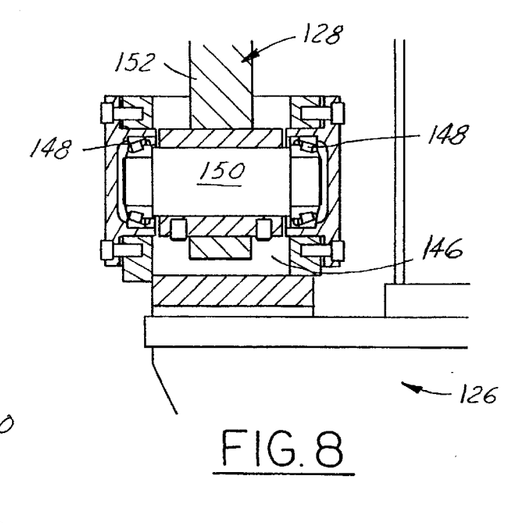
FIG. 8 is a magnified, partial cross-sectional view of a portion of the micro-positioner manipulator enclosed within circle 8 of FIG. 7.

The pitch drive 128 includes a bearing block 146 that mounts directly to the rotary platen 132. As shown in FIG. 8, the bearing block 146 houses two tapered roller bearings 148 and a pivot shaft 150 that serves as the centerline of rotation for the pitch motion. As shown in FIG. 7, a swing arm 152 connects to the pivot shaft 150 on one end and to a pitch link 153 on the other end. The pitch link 153 connects the swing arm 152 to the pitch motion actuator 137 and is necessary for compliance during the motion translation.

Figure 9:
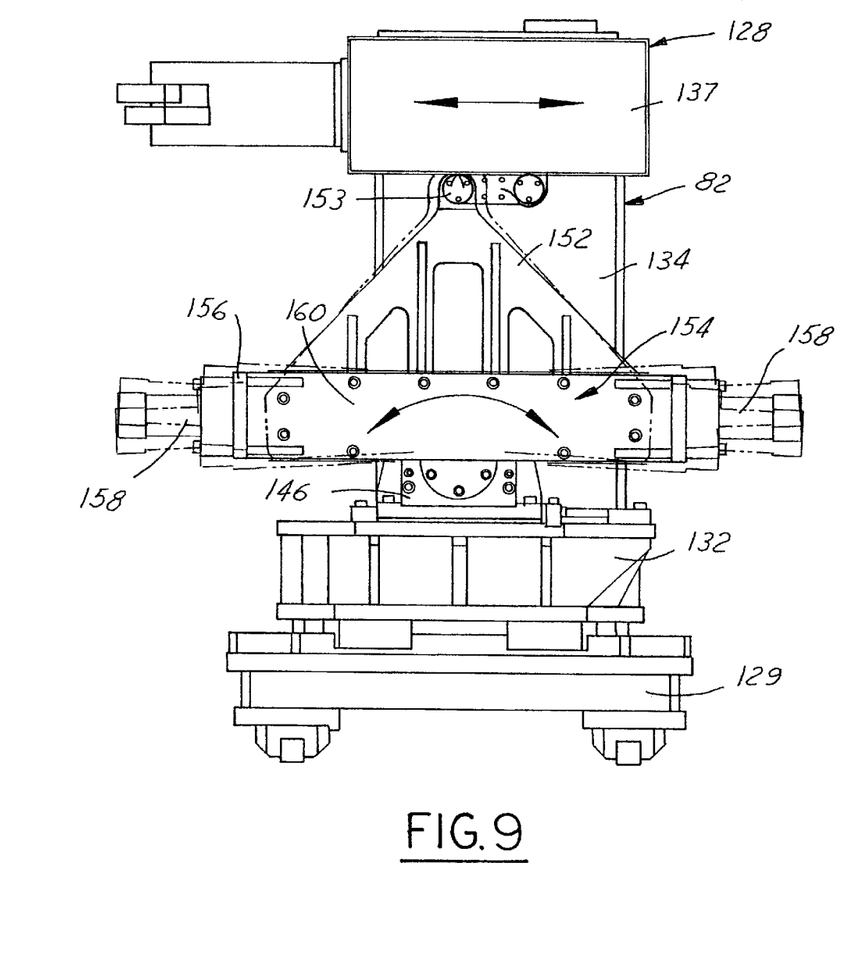
FIG. 9 is a side view of the manipulator of FIG. 7 with phantom lines indicating motion about a pitch axis.
Figure 10:
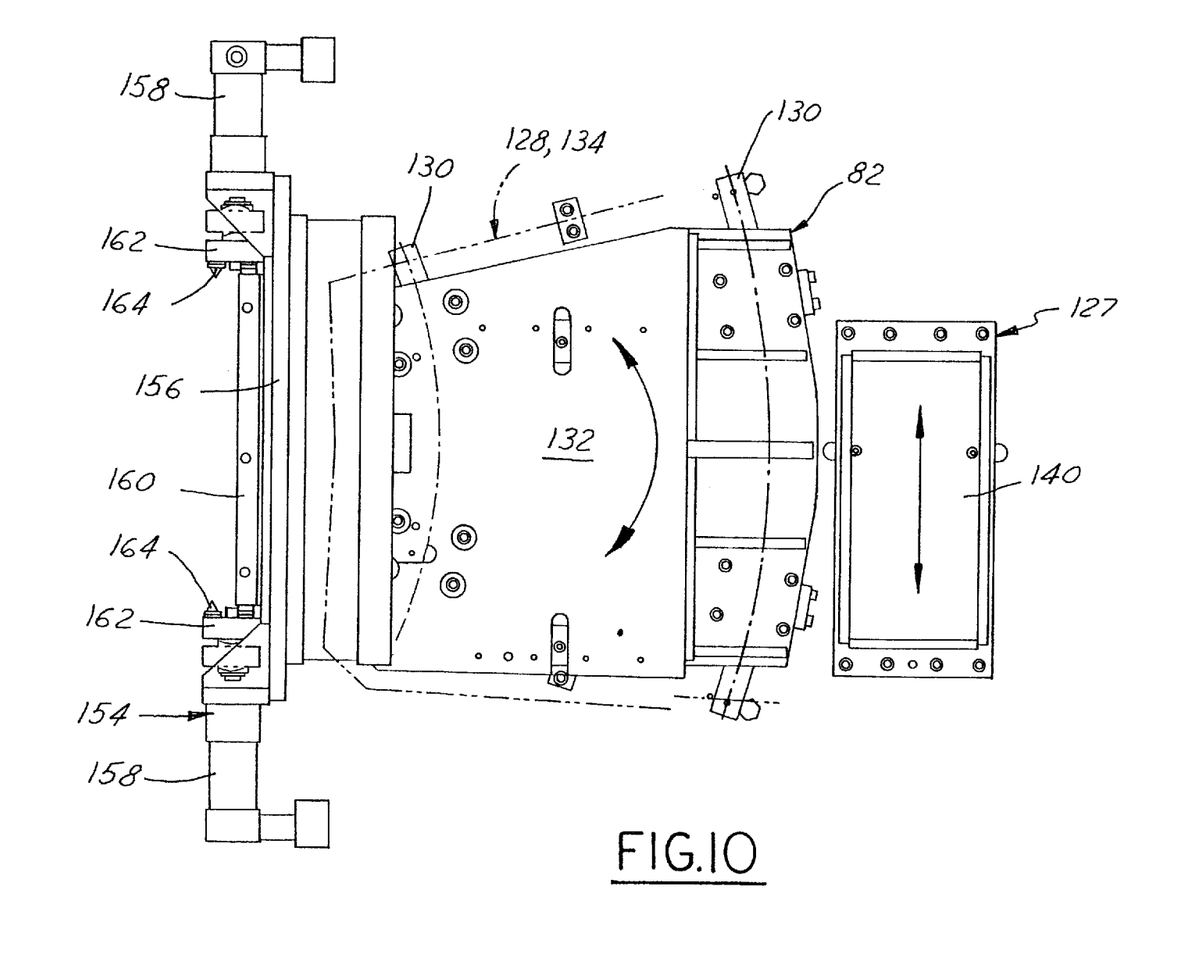
FIG. 10 is a top view of rotary platen, gripper assembly and yaw drive elements of the manipulator.

A gripper assembly 154 is used to attach the micro-positioner manipulator 82 to the micro-positioner 16. As shown in FIGS. 9 and 10, the gripper assembly 154 includes a gripper housing 156 that mounts to the swing arm 152. Two hydraulic cylinders 158 mount on either end of the gripper housing 156. In addition, a location block, shown at 160 in FIGS. 9 and 10, mounts on the gripper housing 156. A coupling detail 162 mounts on each of the two cylinders 158 and includes three locating details 164 formed on an axially inward facing surface of the coupling detail 162. When the micro-positioner manipulator 82 is advanced into engagement with the micro-positioner 16, the cylinders 158 are advanced pushing two of the locating details 164 into the location block 160 and the third into a micro-positioner location block 166 best shown in FIG. 5. Cylinder force is maintained for the entire time the micro-positioner manipulator 82 is operating.

The bearings in the micro-positioner 16 control the axes 22, 26 of rotation of its two motions. The precise yaw motion is controlled by the axis of the cylindrical bearing 42 in the micro-positioner 16. Referring to FIG. 10, when the manipulator 82 is engaged and the micro-positioner locking devices are released, the yaw motion actuator 140 moves in the Z-direction causing the rotary platen 132 and yaw axis 26 of the micro-positioner 16 to rotate in a yaw direction.

The initial position and the pitch and yaw motion of the workpiece is measured by a part location system. Referring to FIG. 7, the precise yaw motion is measured via a first optical encoder 168 of the part locating system. The first encoder 168 is used in a control loop of the manipulator 82. A read head 170 of the first encoder 168 mounts on the slide unit 129, while a second portion 172 of the first encoder 168 mounts in a notch on a top surface of the seal plate 173. As shown in FIG. 4, the second portion 172 of the first encoder 168 protrudes radially outward from a circumferential outer edge of the seal plate 173. A distal end of the second portion 172 includes an arcuate surface defined by a radius extending from the rotational axis 26 of the micropositioner 16. The curved arcuate surface bears markings used by the read head 170 to detect rotational motion.

Referring to FIG. 9, after the yaw axis 26 is positioned, the pitch motion actuator 137 moves in the Z-direction causing the swing arm 152 and pitch axis 22 of the micro-positioner 16 to rotate. They rotate in the pitch direction about the axis of the cylindrical bearings in the bearing blocks 68 as is best shown in FIG. 5.

Referring to FIG. 7, the precise pitch motion is measured via a second optical encoder 174 of the part location system. A read head 176 of the second encoder 174 mounts on top of the column 134, while a second portion of the second encoder 174 mounts on a side of the fixture 18 that would be mounted on the micro-positioner 16 as shown in FIG. 1. Similar to the second portion 172 of the first encoder 168, a distal end of the second portion of the second encoder 174 includes an arcuate surface defined by a radius extending from the yaw axis of the micropositioner 16. The curved arcuate surface bears markings used by the read head 176 to detect yaw motion. The second encoder 174 may alternatively be positioned lower to read directly from the micro-positioner 16 but resolution would be reduced.

After both pitch and yaw motions are complete, the locking devices for both axes 22, 26 are advanced, locking the micro-positioner 16, and the micro-positioner manipulator 82 is disengaged. The micro-positioner 16 and fixtured workpiece 12 are then ready for subsequent manufacturing operations.

In practice, small pitch and yaw location errors in a workpiece 12 supported on a machine tool can be corrected by initially securing the workpiece 12 on the fixture 18 at the micro-positioning station 34 rather than on the machine tool. The part location system is then actuated to determine the location and attitude of the workpiece 12 relative to base 28 of the micro-positioner 16. Once the location and attitude of the workpiece have been determined, the manipulator 82 is actuated to engage the tilt plate 40 of the micro-positioner 16 and to correct pitch and yaw attitude errors of the workpiece 12 relative to the micro-positioner base. The pitch and yaw errors are corrected by actuating the manipulator 82 to rotate the workpiece 12 about the pitch and yaw axes 22, 26 until the part location system determines that the workpiece 12 is properly positioned relative to the base 28. Once the corrections have been made and the workpiece 12 is accurately oriented in pitch and yaw relative to the base 28, the pitch and yaw axes are locked, then the manipulator 82 is disengaged from the micro-positioner 16.

The micro-positioner 16, fixture 18, and workpiece 12 are then moved as a unit from the micro-positioning station 34 and transported to and precisely located at a predetermined position on the locating platform of a first machine tool. Where a machine tool is a 3-axis machine tool, the machine tool is actuated to correct linear position errors along the pitch, yaw and roll axes as well as any roll attitude error about the roll axis. The machine tool then performs a first machining operation on the workpiece.

When the first machine tool has completed its machining operation, the micro-positioner 16, fixture 18, and workpiece 12 may then be moved as a unit from the locating platform of the first machine tool to the locating platforms of additional machine tools. At each successive locating platform, the detents of the micro-positioner base 28 are aligned and engaged with the corresponding detents of the locating platform. At each locating platform, the host machine tool is then actuated to correct linear position errors along the pitch, yaw and roll axes and roll attitude errors about the roll axis, and to perform an additional machining operation on a workpiece 12 supported on the fixture 18.

This apparatus 10 allows for pitch and yaw error correction after a workpiece 12 has been loaded into its fixture 18. It's capable of correcting these errors to an accuracy of 5 arc-seconds with a repeatability of 2.5 arc-seconds. In addition, the apparatus 10 is designed to have high static and dynamic stiffness to withstand the cutting forces during machining. It is sealed so that the harsh machining environment does not effect is performance. Furthermore, it does not require onboard power or servo actuation devices, which drastically reduces the cost of each micro-positioner 16.

The micro-positioning apparatus 10 and method described above are becoming very important as technology moves closer to a truly flexible manufacturing environment. With this apparatus 10 supporting a workpiece-holding fixture 18, there is no longer a need to form dedicated locating features on the fixture 18 and/or workpiece 12.

This description is intended to illustrate certain embodiments of the invention rather than to limit the invention. Therefore, it uses descriptive rather than limiting words. Obviously, it's possible to modify this invention from what the description teaches. Within the scope of the claims, one may practice the invention other than as described.

We claim:

1. A workpiece micro-positioning apparatus for correcting small pitch and yaw location errors in a workpiece supported on a fixture for manufacturing operations, the apparatus comprising:

a biaxial micro-positioner including:
   a pitch motion mechanism configured to support a workpiece for rotation about a pitch axis;
   a yaw motion mechanism supporting the pitch motion mechanism for rotation about a yaw axis generally normal to the pitch axis; and
   a base supporting the pitch and yaw motion mechanism;

the apparatus further comprising:
   a fixture supported on the micro-positioner and configured to releasably hold a workpiece, the micro-positioner configured to allow rotation of the fixture about the pitch and yaw axes to correct any pitch and yaw deviations from a desired workpiece attitude relative to the base and to releasably lock the pitch and yaw motion mechanisms following such correction.

2. A workpiece micro-positioning apparatus for correcting small pitch and yaw location errors in a workpiece supported on a fixture for a manufacturing operation, the apparatus comprising:

a biaxial micro-positioner including:
- a pitch motion mechanism configured to support a workpiece for rotation about a pitch axis;
- a yaw motion mechanism supporting the pitch motion mechanism for rotation about a yaw axis generally normal to the pitch axis;
- a base supporting the pitch and yaw motion mechanism;

the apparatus further comprising:
- a fixture fixed to the micro-positioner and configured to releasably hold a workpiece, the micro-positioner configured to allow rotation of the fixture about the pitch and yaw axes to correct any pitch and yaw deviations from a desired workpiece attitude relative to the base and to releasably lock the pitch and yaw motion mechanisms following such correction; and
- a manipulator configured to releasably engage the micro-positioner and rotate the pitch and yaw motion mechanisms about the pitch and yaw axes, respectively.

3. A workpiece micro-positioning apparatus as defined in claim 2 in which the manipulator includes:
- a yaw drive operably coupled to the micro-positioner and configured to rotate the yaw motion mechanism about the yaw axis; and
- a pitch drive operably coupled to the micro-positioner and configured to rotate the pitch motion mechanism about the pitch axis.

4. A workpiece micro-positioning apparatus as defined in claim 2 in which the manipulator is configured to actuate both the pitch and yaw motion mechanisms by manipulating a component of only one of the pitch and yaw motion mechanisms.

5. A workpiece micro-positioning apparatus as defined in claim 2 in which the micro-positioner includes on-board mechanical pitch and yaw motion locking devices configured to releasably anchor the pitch and yaw motion mechanisms against pitch and yaw motion, respectively.

6. A workpiece micro-positioning apparatus as defined in claim 5 in which:
- the pitch and yaw motion locking devices are biased into respective locked positions; and
- the micro-positioner includes pitch and yaw motion lock release assemblies configured to drive the locking devices into respective released positions.

7. A workpiece micro-positioning apparatus for correcting small pitch and yaw location errors in a workpiece supported on a fixture for a manufacturing operation, the apparatus comprising:
a biaxial micro-positioner including:
- a pitch motion mechanism configured to support a workpiece for rotation about a pitch axis;
- a yaw motion mechanism supporting the pitch motion mechanism for rotation about a yaw axis generally normal to the pitch axis; and
- a base supporting the pitch and yaw motion mechanism;

the apparatus further comprising:
- a fixture fixed to the micro-positioner and configured to releasably hold a workpiece, the micro-positioner configured to allow rotation of the fixture about the pitch and yaw axes to correct any pitch and yaw deviations from a desired workpiece attitude relative to the base and to releasably lock the pitch and yaw motion mechanisms following such correction; and
- the yaw motion mechanism including a rotatable and releasably lockable rotary plate supported on the base for rotation about the yaw axis, the pitch motion mechanism including a releasably lockable tilt plate disposed parallel to the pitch axis and supported on the rotary plate for tilting motion about the pitch axis.

8. A workpiece micro-positioning apparatus as defined in claim 7 in which the pitch and yaw motion locking devices are configured to releasably lock the respective tilt and rotary plates adjacent outer edges of the plates.

9. A workpiece micro-positioning apparatus for correcting small pitch and yaw location errors in a workpiece supported on fixture for a manufacturing operation, the apparatus comprising:
a biaxial micro-positioner including:
- a pitch motion mechanism configured to support a workpiece for rotation about a pitch axis;
- a yaw motion mechanism supporting the pitch motion mechanism for rotation about a yaw axis generally normal to the pitch axis; and
- a base supporting the pitch and yaw motion mechanism;

the apparatus further comprising:
- a fixture fixed to the micro-positioner and configured to releasably hold a workpiece, the micro-positioner configured to allow rotation of the fixture about the pitch and yaw axes to correct any pitch and yaw deviations from a desired workpiece attitude relative to the base and to releasably lock the pitch and yaw motion mechanisms following such correction; and
- inner and outer radially-spaced concentric supports rotatably supporting the rotary plate to limit motion of a supported workpiece under manufacturing loads.

10. A workpiece micro-positioning apparatus as defined in claim 9 in which the outer concentric support comprises an annular bearing.

11. A workpiece micro-positioning apparatus as defined in claim 10 in which the bearing comprises two preloaded, needle roller annular thrust bearings disposed above and below the rotary plate, respectively, and configured to rotatably retain the rotary plate.

12. A method for correcting small pitch and yaw location errors in a workpiece supported on a fixture for a manufacturing operation, the method including the steps of:
- providing a micro-positioner apparatus including a pitch motion mechanism configured to support a workpiece for rotation about a pitch axis, a yaw motion mechanism supporting the pitch motion mechanism for rotation about a yaw axis generally normal to the pitch axis, and a base supporting the pitch and yaw motion mechanism;
- providing a fixture on the micro-positioner;
- providing a manipulator configured to releasably engage the micro-positioner and rotate the pitch and yaw motion mechanisms about the pitch and yaw axes, respectively;
- providing a workpiece on the fixture;
- causing the manipulator to engage the micro-positioner; and
- correcting pitch and yaw attitude errors of the workpiece relative to the micropositioner base by actuating the manipulator to rotate the workpiece about the pitch and yaw axes.

13. The method of claim 12 in which the step of correcting pitch and yaw attitude errors of the workpiece includes actuating the manipulator to engage the tilt plate of the micro-positioner.

14. A method of correcting small pitch and yaw location errors in a workpiece supported on a fixture for a manufacturing operation, the method comprising the steps of:

providing a biaxial micro-positioner including:
   supporting a workpiece with a pitch motion mechanism for rotation about a pitch axis;
   supporting the pitch motion mechanism with a yaw motion mechanism for rotation about a yaw axis generally normal to the pitch axis; and
   supporting the pitch and yaw motion mechanism on a base;

the method further comprising:
   attaching a fixture to the micro-positioner to releasably hold a workpiece;
   providing a rotatable and releasably lockable rotary plate supported on the base for rotation about the yaw axis as part of the yaw motion mechanism;
   rotating the fixture about the pitch and yaw axes to correct any pitch and yaw deviations from a desired workpiece attitude relative to the base;
   releasably locking the pitch and yaw motion mechanisms following such correction; and
   providing a releasably lockable tilt plate disposed parallel to the pitch axis and supported on the rotary plate for tilting motion about the pitch axis as part of the pitch motion mechanism.

15. The method of correcting small pitch and yaw location errors in a workpiece as defined in claim 14 further comprising the step of releasably locking the respective tilt and rotary plates adjacent outer edges of the plates.

* * * * *

UNITED STATES PATENT AND TRADEMARK OFFICE
CERTIFICATE OF CORRECTION

PATENT NO. : 6,637,737 B1
DATED : October 28, 2003
INVENTOR(S) : Beecherl et al.

It is certified that error appears in the above-identified patent and that said Letters Patent is hereby corrected as shown below:

Column 7,
Line 11, delete after the word "also" the word "are"
Line 39, delete the word "nornal" and insert therein -- normal --

Column 8,
Line 29, delete the word "arid" and insert therein -- and --
Line 32, delete the word "levis" and insert therein -- clevis --
Line 38, delete the word "liner" and insert therein -- linear --

Column 12,
Line 11, insert the word -- a -- between "on" and "fixture"

Signed and Sealed this

Thirteenth Day of January, 2004

JON W. DUDAS
*Acting Director of the United States Patent and Trademark Office*